United States Patent
Shin

(10) Patent No.: US 8,917,353 B2
(45) Date of Patent: Dec. 23, 2014

(54) SHUTTER CONTROL SYSTEM AND IMAGE APPARATUS INCLUDING THE SAME

(75) Inventor: Hye-Jin Shin, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 340 days.

(21) Appl. No.: 13/315,097

(22) Filed: Dec. 8, 2011

(65) Prior Publication Data

US 2012/0169853 A1 Jul. 5, 2012

(30) Foreign Application Priority Data

Jan. 4, 2011 (KR) .................. 10-2011-0000589

(51) Int. Cl.
*H04N 5/68* (2006.01)
*H04N 13/04* (2006.01)

(52) U.S. Cl.
CPC ...... *H04N 13/0438* (2013.01); *H04N 2213/008* (2013.01)
USPC .............. 348/377; 348/56; 345/204; 345/690

(58) Field of Classification Search
USPC .................................. 348/377; 345/290, 204
See application file for complete search history.

(56) References Cited

U.S. PATENT DOCUMENTS

| 6,448,952 | B1 | 9/2002 | Toyoda et al. |
| 8,643,707 | B2* | 2/2014 | Matsumoto et al. ............ 348/56 |
| 2009/0140661 | A1* | 6/2009 | Park et al. .................. 315/169.3 |
| 2011/0074838 | A1* | 3/2011 | Yamamoto et al. ........... 345/690 |
| 2011/0216056 | A1* | 9/2011 | Yoo et al. ....................... 345/212 |
| 2011/0298836 | A1* | 12/2011 | Komiya et al. ............... 345/690 |

FOREIGN PATENT DOCUMENTS

| KR | 10-2003-0081769 A | 10/2003 |
| KR | 10-2008-0055081 A | 6/2008 |

* cited by examiner

*Primary Examiner* — Helen Shibru
(74) *Attorney, Agent, or Firm* — Christie, Parker & Hale, LLP

(57) ABSTRACT

An image apparatus with reduced three-dimensional (3D) crosstalk includes a shutter control system including an infrared (IR) signal transmitter configured to receive from a display device for displaying two or more light-off sections and two or more light-on sections arranged alternately in one image frame, information corresponding to the light-off sections and the light-on sections, and to output an IR signal corresponding to the information, the IR signal corresponding to a start of a first light-off section of the light-off sections in the image frame, and a shutter controller configured to receive the IR signal, and to control opening or closing of a left shutter and a right shutter in accordance with the IR signal.

6 Claims, 8 Drawing Sheets

SHUTTER CONTROL SYSTEM AND IMAGE APPARATUS INCLUDING THE SAME

CROSS-REFERENCE TO RELATED APPLICATION

This application claims priority to and benefit of Korean Patent Application No. 10-2011-0000589, filed on Jan. 4, 2011 in the Korean Intellectual Property Office, the disclosure of which is incorporated herein by reference in its entirety.

BACKGROUND

1. Field

The present invention relates to a shutter control system and an image apparatus including the same.

2. Description of Related Art

In general, primary factors that cause a human to perceive a stereoscopic effect are a physiological factor and an experiential factor. In a three-dimensional (3D) image displaying technology, binocular parallax is generally used to express the stereoscopic effect of an object. The binocular parallax is a primary factor of recognizing the stereoscopic effect at short distances. In order to express the stereoscopic effect of an object, binocular parallax achieved by alternately opening or closing a left shutter and a right shutter of 3D glasses may be used.

When the left and right shutters of the 3D glasses are alternately opened or closed, a response time of a shutter to a control signal and the on/off speed of the shutter itself may cause 3D crosstalk.

SUMMARY

Aspects of embodiments of the present invention provide a shutter control system which can reduce three-dimensional (3D) crosstalk.

Aspects of embodiments of the present invention also provide an image apparatus including the shutter control system to reduce 3D crosstalk.

However, aspects of embodiments of the present invention are not restricted to the one set forth herein. The above and other aspects of embodiments of the present invention will become more apparent to one of ordinary skill in the art to which embodiments of the present invention pertains by referencing the detailed description of embodiments of the present invention given below.

According to an aspect of embodiments of the present invention, there is provided a shutter control system including an infrared (IR) signal transmitter configured to receive from a display device for displaying two or more light-off sections and two or more light-on sections arranged alternately in one image frame, information corresponding to the light-off sections and the light-on sections, and to output an IR signal corresponding to the information, the IR signal corresponding to a start of a first light-off section of the light-off sections in the image frame, and a shutter controller configured to receive the IR signal, and to control opening or closing of a left shutter and a right shutter in accordance with the IR signal.

The one image frame may include the first light-off section, a first light-on section, a second light-off section, and a second light-on section arranged sequentially in this order, and a rising edge of the IR signal may correspond to the start of the first light-off section.

The shutter controller may be configured to control the left shutter to be opened while controlling the right shutter to be closed when the IR signal is in a high state, and may be configured to control the right shutter to be opened while controlling the left shutter to be closed when the IR signal is in a low state.

A section in which the left shutter is opened while the right shutter is closed may overlap the first light-off section, and a section in which the right shutter is opened while the left shutter is closed may overlap the second light-off section.

According to another aspect of embodiments of the present invention, there is provided an image apparatus including a voltage generator configured to generate a first voltage and a second voltage, the second voltage having two or more high states and two or more low states in one image frame, a display unit including a plurality of pixels configured to receive the first and second voltages, a data signal, and a gate signal, and configured to be lit or unlit corresponding to the first and second voltages, the data signal, and the gate signal, a controller configured to receive the second voltage and to output a feedback signal corresponding to at least one of a rising edge or a falling edge of the second voltage, an IR signal transmitter configured to receive the feedback signal and to output an IR signal corresponding to at least one of the rising edge or the falling edge of the second voltage, and shutter glasses including a left shutter, a right shutter, and a shutter controller that is configured to receive the IR signal and to control opening or closing of the left shutter and the right shutter corresponding to the IR signal.

Each of the pixels may be configured to be unlit when receiving the second voltage in the high state, and may be configured to be lit when receiving the second voltage in the low state.

The first voltage may include ELVDD, and the second voltage may include ELVSS.

The second voltage may have a first rising edge, a first falling edge, a second rising edge, and a second falling edge, the IR signal may rise corresponding to the first rising edge of the second voltage and remain in the high state, and may fall corresponding to the second rising edge of the second voltage and remain in the low state.

The shutter controller of the shutter glasses may be configured to control the left shutter to be opened while controlling the right shutter to be closed corresponding to a rising edge of the IR signal, and may be configured to control the right shutter to be opened while controlling the left shutter to be closed corresponding to a falling edge of the IR signal.

A section in which the left shutter is opened while the right shutter is closed may be between the first rising edge and the first falling edge of the second voltage, and a section in which the right shutter is opened while the left shutter is closed may be between the second rising edge and the second falling edge of the second voltage.

According to another embodiment of the present invention, there is provided an image apparatus including a voltage generator configured to generate a first voltage and a second voltage, the second voltage having two or more high states and two or more low states in one image frame, a display unit including a plurality of pixels configured to receive the first and second voltages, a data signal, and a gate signal, and configured to be lit or unlit corresponding to the first and second voltages, the data signal, and the gate signal, a controller configured to receive information about a delay time from a user and to output a feedback signal corresponding to the information, an IR signal transmitter configured to receive the feedback signal and to output an IR signal, the IR signal corresponding to at least one of a rising edge or a falling edge of the second voltage, and shutter glasses including a left shutter, a right shutter, and a shutter controller configured to receive the IR signal, and to control opening or closing of the left shutter and the right shutter corresponding to the IR signal.

Each of the pixels may be configured to be unlit when receiving the second voltage in the high state, and may be configured to be lit when receiving the second voltage in the low state.

The first voltage may include ELVDD, and the second voltage may include ELVSS.

The controller may be configured to receive user inputted information corresponding to the delay time in units of 0.01 to 0.05 ms.

The controller may be configured to output the feedback signal upon receiving the user inputted information, the feedback signal being shifted from a starting point of the image frame by the delay time.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
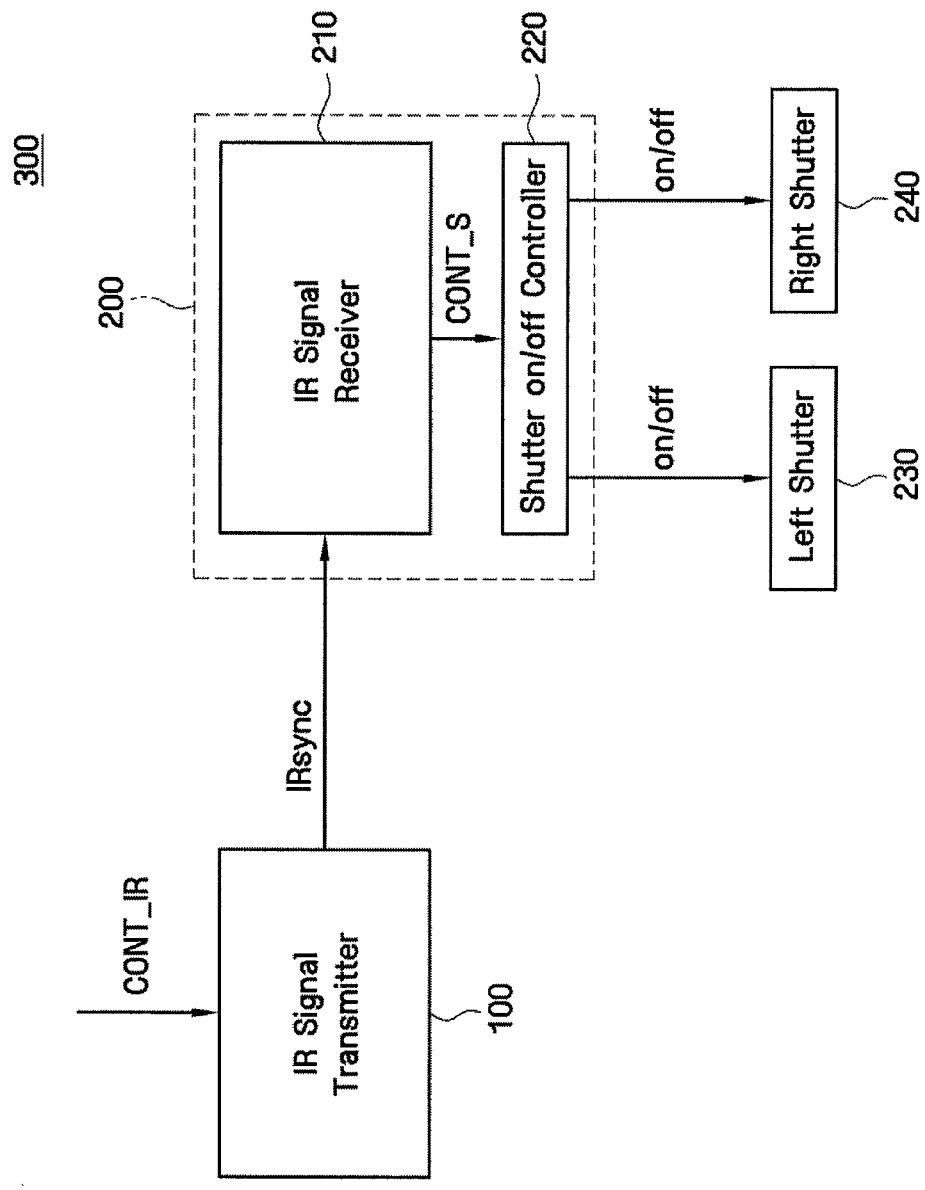
FIG. 1 is a block diagram of a shutter control system according to an exemplary embodiment of the present invention.

Aspects and features of embodiments according to the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will be defined by the appended claims and their equivalents. In the drawings, sizes and relative sizes of elements may be exaggerated for clarity. Like reference numerals refer to like elements throughout the specification. As used herein, the term "and/or" includes any and all combinations of one or more of the associated listed items.

The terminology used herein is for the purpose of describing particular embodiments and is not intended to be limiting of the invention. As used herein, the singular forms are intended to include the plural forms as well, unless the context clearly indicates otherwise. It will be further understood that the terms "comprises" and/or "made of," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

Hereinafter, a shutter control system according to an exemplary embodiment of the present invention will be described with reference to FIGS. 1 and 2.

FIG. 1 is a block diagram of a shutter control system 300 according to an exemplary embodiment of the present invention. FIG. 2 is an operational timing diagram of the shutter control system 300 according to the exemplary embodiment of FIG. 1.

Referring to FIG. 1, the shutter control system 300 may include an infrared (IR) signal transmitter 100 and a shutter controller 200.

The IR signal transmitter 100 may receive from a display device, which has two or more light-off sections and two or more light-on sections arranged alternately in one image frame, information about the light-off sections and the light-on sections, and may output an IR signal IRsync, which is synchronized with a start of a first light-off section in the image frame, based on the received information.

Figure 2:
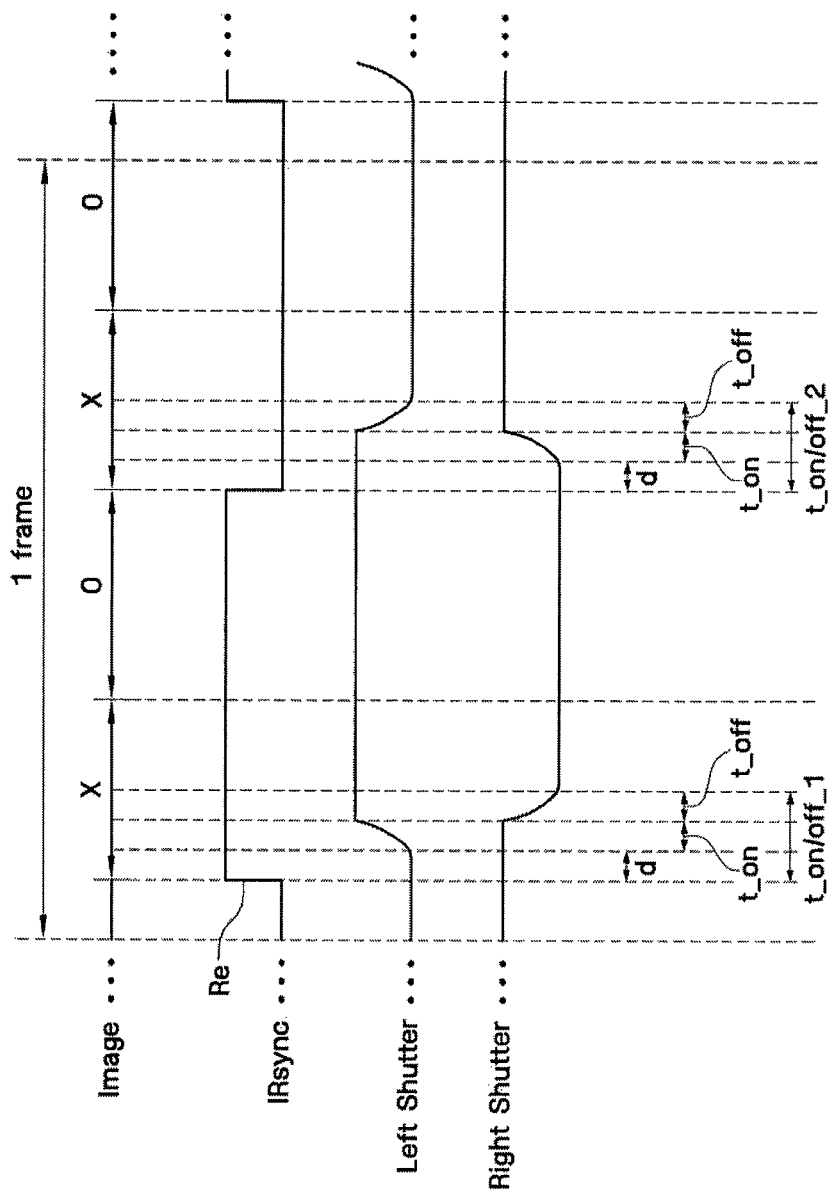
FIG. 2 is an operational timing diagram of the shutter control system according to the exemplary embodiment of FIG. 1.

Specifically, referring to FIG. 2, the IR signal transmitter 100 receives from a display device, which has two or more (for example, two) light-off sections (X sections of an image signal) and two or more (for example, two) light-on sections (O sections of the image signal) arranged alternately in one image frame, information about the light-off sections (the X sections of the image signal) and the light-on sections (the O sections of the image signal) in the form of a feedback signal CONT_IR. Based on the received feedback signal CONT_IR, the IR signal transmitter 100 outputs the IR signal IRsync, which is synchronized with a start of a first light-off section (a first X section of the image signal).

If the light-off sections (the X sections of the image signal) and the light-on sections (the O sections of the image signal) illustrated in FIG. 2 are a first light-off section (a first X section of the image signal), a first light-on section (a first O section of the image signal), a second light-off section (a second X section of the image signal) and a second light-on section (a second O section of the image signal) arranged sequentially in this order, the IR signal transmitter 100 outputs the IR signal IRsync, whose rising edge Re is synchronized with a start of the first light-off section (the first X section of the image signal). In other words, the IR signal transmitter 100 can shift the IR signal IRsync forward or backward such that the start of the first light-off section (the first X section of the image signal) coincides with the rising edge Re of the IR signal IRsync.

Referring back to FIG. 1, the shutter controller 200 may receive the IR signal IRsync and control a left shutter 230 and a right shutter 240 to be opened or closed (turned on or off) based on the received IR signal IRsync. In the shutter control system 300 according to the current exemplary embodiment, the shutter controller 200 may, for example, be included in shutter glasses 250 (see FIG. 3). However, the present invention is not limited to this example. The shutter controller 200 may also be included in visualization tools other than glasses.

The shutter controller 200 may include an IR signal receiver 210 and a shutter on/off controller 220.

The IR signal receiver 210 may receive the IR signal IRsync and output a control signal CONT_S for controlling the shutter on/off controller 220 based on the IR signal IRsync. The shutter on/off controller 220 may receive the control signal CONT_S and directly control the left shutter 230 and the right shutter 240 to be opened or closed (turned on or off). The configuration of the shutter controller 200 is a mere example used to implement an embodiment of the present invention, and the present invention is not limited to the configuration illustrated in FIG. 1.

Referring back to FIG. 2, the shutter controller 200 may receive the IR signal IRsync in a high state (e.g., a logic "1" state) and, based on the received IR signal IRsync in the high state, control the left shutter 230 to be opened while controlling the right shutter 240 to be closed. In addition, the shutter controller 200 may receive the IR signal IRsync in a low state (e.g., a logic "0" state) and, based on the received IR signal IRsync, control the right shutter 240 to be opened while controlling the left shutter 230 to be closed.

Here, it should be noted that a section t_on/off_1 in which the left shutter 230 is opened while the right shutter 240 is closed overlaps the first light-off section (the first X section of the image signal) and that a section t_on/off_2 in which the right shutter 240 is opened while the left shutter 230 is closed overlaps the second light-off section (the second X section of the image signal).

More specifically, the section t_on/off_1 in which the left shutter 230 is opened while the right shutter 240 is closed may consist of a delay section d, which is from when the left shutter 230 receives a command to when the left shutter 230 actually starts to be opened, a section t_on, which is required to open the left shutter 230, and a section t_off, which is required to close the right shutter 240. Since all of the above sections overlap the first light-off section (the first X section of the image signal) during which an image is not displayed, three-dimensional (3D) crosstalk caused by shutter opening or closing can be reduced or minimized.

The section t_on/off_2 in which the right shutter 240 is opened while the left shutter 230 is closed may consist of a delay section d, which is from when the right shutter 240 receives a command to when the right shutter 240 actually starts to be opened, a section t_on, which is required to open the right shutter 240, and a section t_off, which is required to close the left shutter 230. Since all of the above sections overlap the second light-off section (the second X section of the image signal) during which an image is not displayed, 3D crosstalk caused by shutter opening or closing can be reduced or minimized. That is, the shutter control system 300 according to the current exemplary embodiment can reduce or minimize a response time d of a shutter to the IR signal IRsync and 3D crosstalk caused by the on/off speed (t_on/t_off) of the shutter itself.

Hereinafter, an image apparatus including this shutter control system 300 according to an exemplary embodiment of the present invention will be described with reference to FIGS. 3 through 7.

Figure 3:
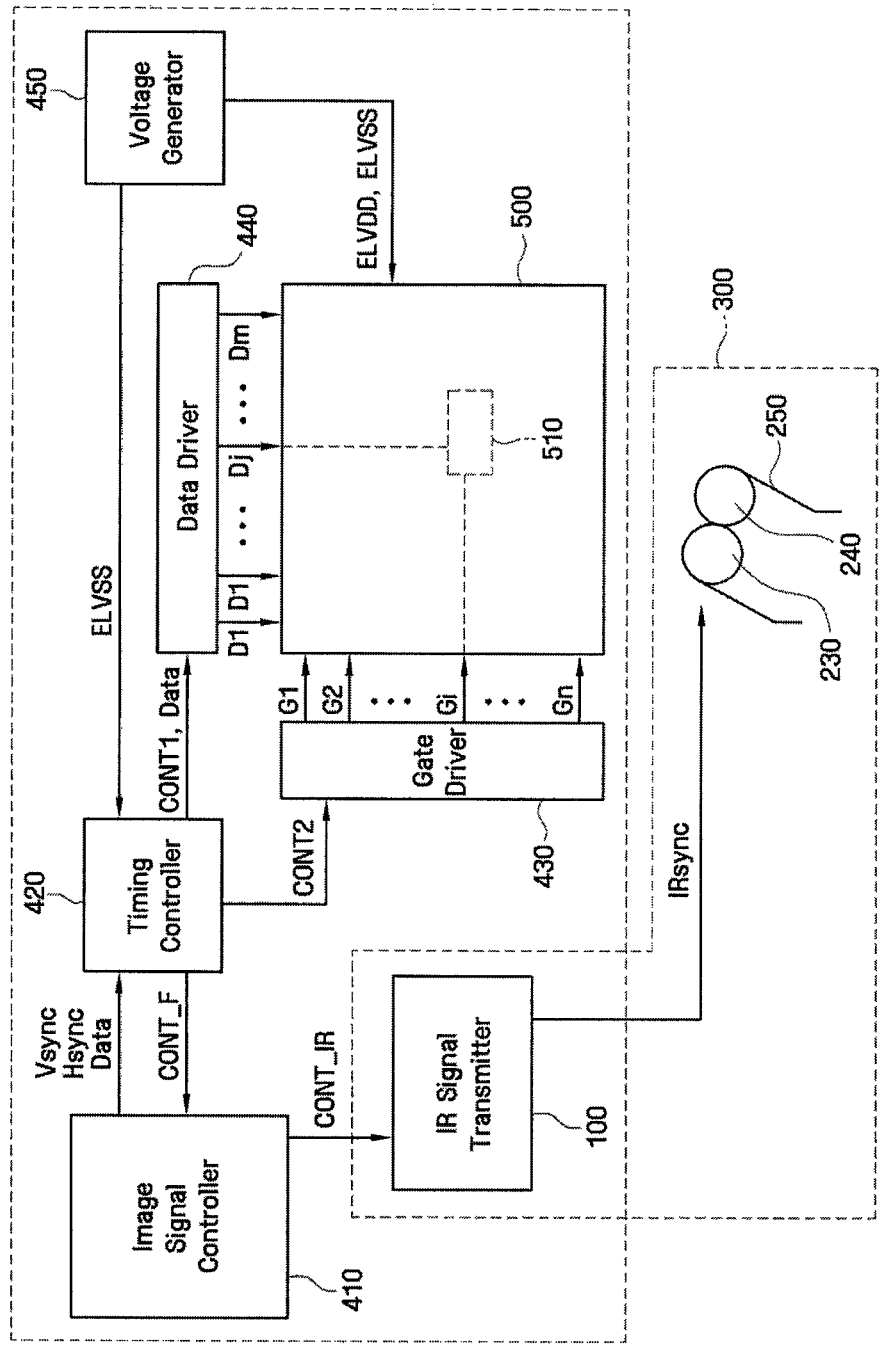
FIG. 3 is a block diagram of an image apparatus according to an exemplary embodiment of the present invention.
Figure 4:
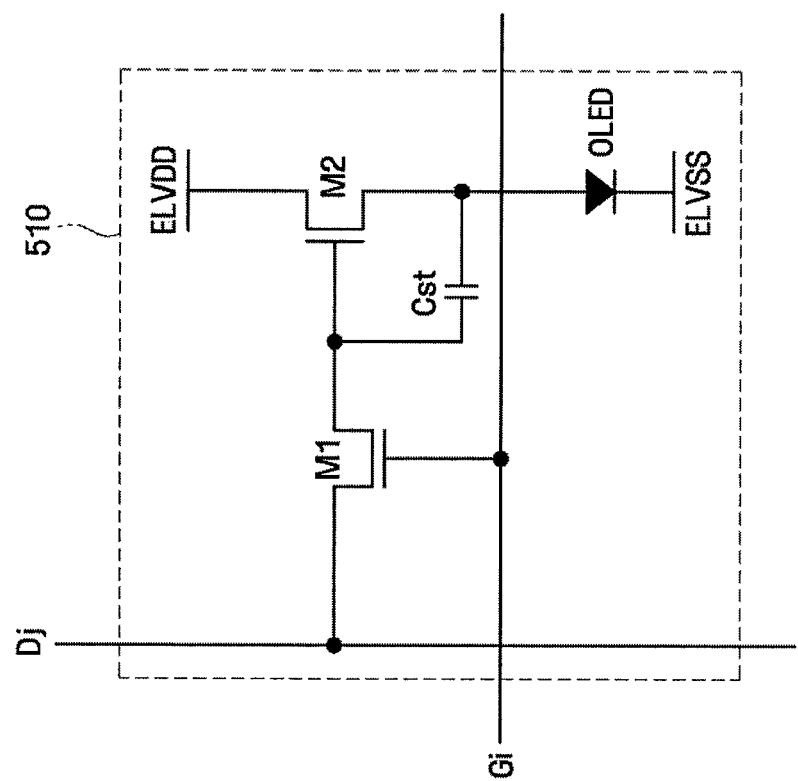
FIG. 4 is a circuit diagram of one pixel included in the image apparatus according to the exemplary embodiment of FIG. 3.
Figure 5:
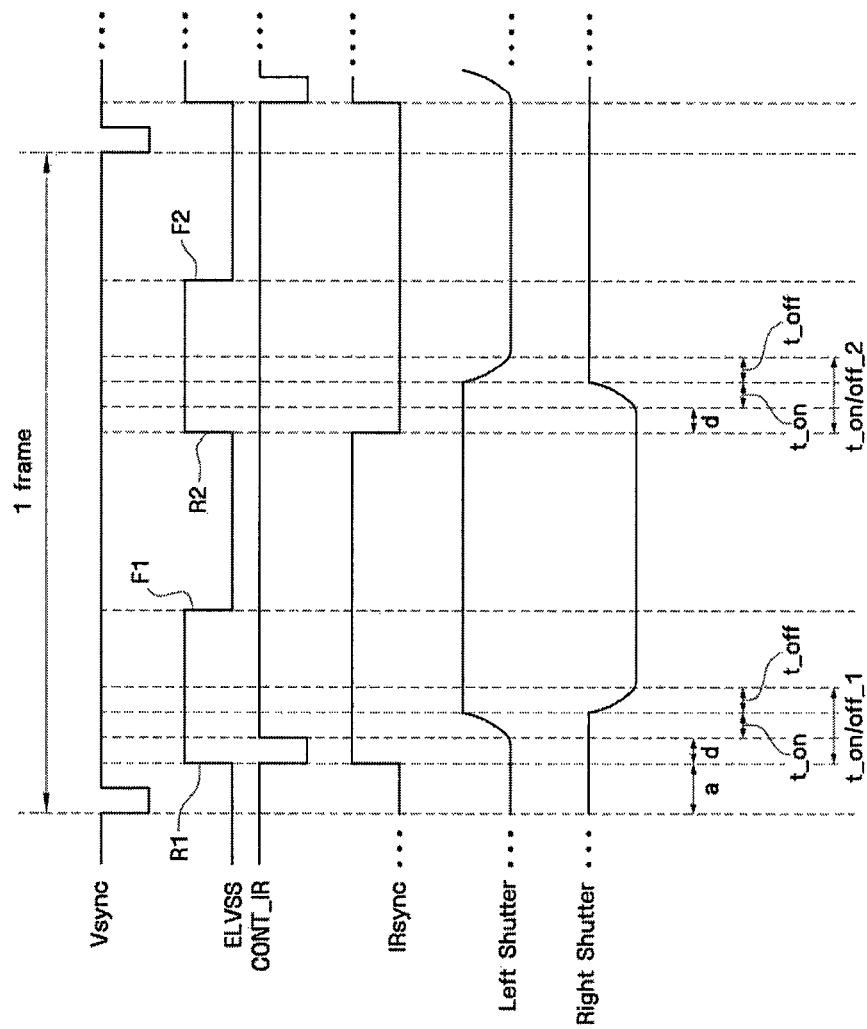
FIG. 5 is an operational timing diagram of the image apparatus according to the exemplary embodiment of FIG. 3.
Figure 6:
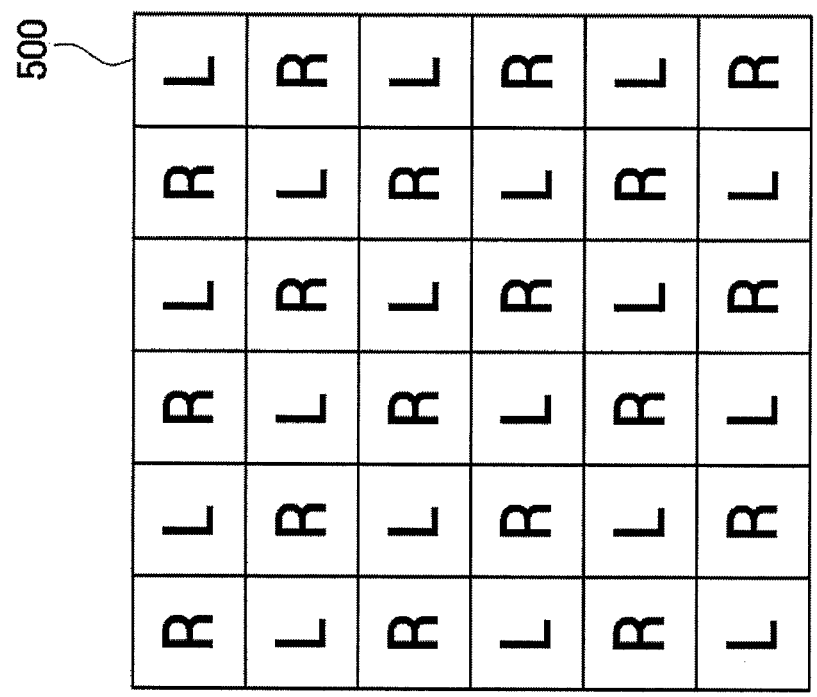
FIGS. 6 and 7 are diagrams for explaining how display units included in image apparatuses according to the exemplary embodiment of FIG. 3 and a modified embodiment of the exemplary embodiment of FIG. 3 display images.
Figure 7:
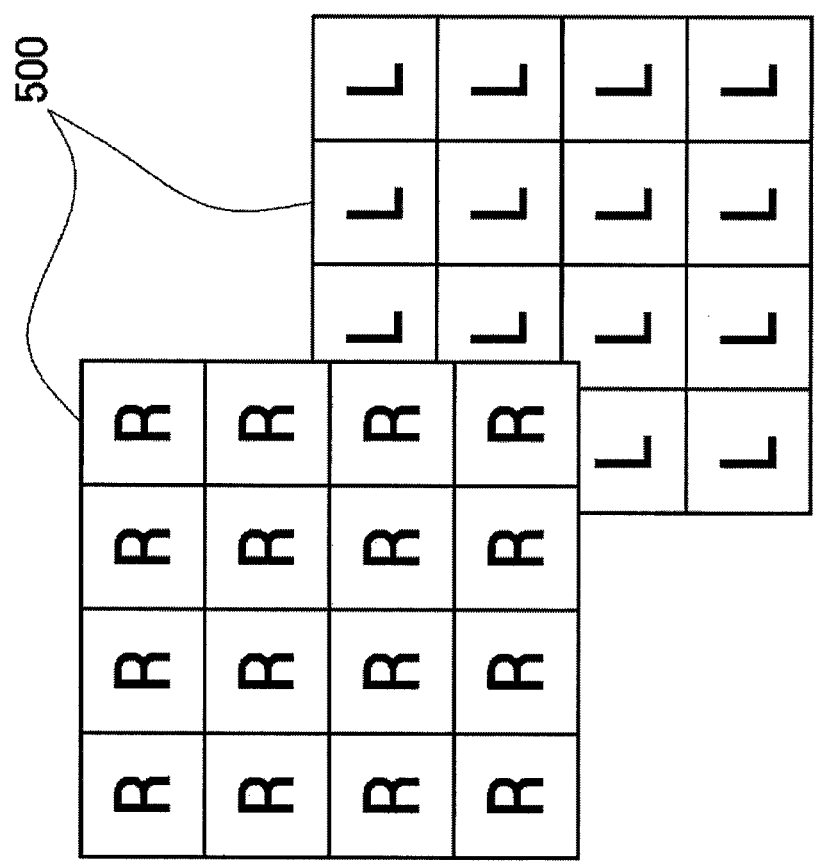

FIG. 3 is a block diagram of an image apparatus according to an exemplary embodiment of the present invention. FIG. 4 is a circuit diagram of one pixel included in the image apparatus according to the exemplary embodiment of FIG. 3. FIG. 5 is an operational timing diagram of the image apparatus according to the exemplary embodiment of FIG. 3. FIGS. 6 and 7 are diagrams for explaining how display units 500 included in image apparatuses according to the exemplary embodiment of FIG. 3 and a modified embodiment of the exemplary embodiment of FIG. 3 display images.

The image apparatus according to the current exemplary embodiment will hereinafter be described using an image apparatus including a display device, which is illustrated in FIGS. 3 and 4, and which has organic light-emitting diodes, as an example. However, the present invention is not limited to this display device. In addition, the block configuration of FIG. 3 is merely an example and does not limit the scope of the present invention. Lastly, a detailed description of elements identical to the above-described elements of the shutter control system 300 according to the exemplary embodiment of FIG. 1 will be omitted, and the following description will focus on other elements. Like reference numerals in the drawings denote like elements, and thus, the above-described features of the shutter control system 300 according to the exemplary embodiment of FIG. 1 may be incorporated and claimed in the following image apparatus.

Referring to FIG. 3, the image apparatus according to the current exemplary embodiment may include an image signal controller 410, a timing controller 420, a gate driver 430, a data driver 440, a voltage generator 450, the display unit 500, and a shutter control system 300.

The image signal controller 410 may provide a vertical synchronization signal Vsync, a horizontal synchronization signal Hsync, and an image signal Data to the timing controller 420. In addition, the image signal controller 410 may receive a feedback control signal CONT_F from the timing controller 420 and provide a feedback signal CONT_IR to an IR signal transmitter 100. While the image signal controller 410 receives the feedback control signal CONT_F from the timing controller 420 and transmits the feedback signal CONT_IR to the IR signal transmitter 100 in FIG. 3, the timing controller 420 may also transmit the feedback signal CONT_IR directly to the IR signal transmitter 100 when necessary.

The timing controller 420 may receive the vertical synchronization signal Vsync, the horizontal synchronization signal Hsync and the image signal Data from the image signal controller 410, and may transmit the image signal Data and a data driver control signal CONT1 to the data driver 440 so as to control the data driver 440 to transmit data signals D1 through Dm to the display unit 500 on a predetermined cycle (e.g., in every cycle of the vertical synchronization signal Vsync). In addition, the timing controller 420 may transmit a gate driver control signal CONT2 to the gate driver 430 so as to control the gate driver 430 to transmit gate signals G1 through Gn to the display unit 500 on a predetermined cycle (e.g., in every period of the horizontal synchronization signal Hsync).

The gate driver 430 may be controlled by the timing controller 420 and may transmit the gate signals G1 through Gn to a plurality of gate lines of the display unit 500 on a predetermined cycle (e.g., in every cycle of the horizontal synchronization signal Hsync). Likewise, the data driver 440 may be controlled by the timing controller 420 and may transmit the data signals D1 through Dm to a plurality of data lines of the display unit 500 on a predetermined cycle (e.g., in every cycle of the vertical synchronization signal Vsync). The voltage generator 450 generates a voltage for driving a plurality of pixels 510 included in the display unit 500. For example, the voltage generator 450 may generate a first voltage ELVDD and a second voltage ELVSS, and may apply the first voltage ELVDD and the second voltage ELVSS to the pixels 510 of the display unit 500.

The display unit 500 may include the pixels 510. Referring to FIG. 4, each of the pixels 510 may include an organic light-emitting diode OLED, a first transistor M1 (i.e., a driving transistor), a storage capacitor Cst, and a second transistor M2 (i.e., a switching transistor), which are coupled to a gate line Gi and a data line Dj.

In the embodiment of FIG. 4, the first transistor M1 has a gate electrode coupled to the gate line Gi, a first electrode coupled to the data line Dj, and a second electrode coupled to a first terminal of the storage capacitor Cst. Here, the first electrode may be set to be a source electrode or a drain electrode, and the second electrode may be set to be the other one of the source electrode and the drain electrode. When receiving a gate signal from the gate line Gi, the first transistor M1 coupled to the gate line Gi and the data line Dj may be turned on to transmit a data signal received from the data line Dj to the storage capacitor Cst. Here, the storage capacitor Cst may be charged with a voltage corresponding to the data signal.

The second transistor M2 has a gate electrode coupled to the first terminal of the storage capacitor Cst, and may be supplied with the first voltage ELVDD through a first electrode. In addition, a second electrode of the second transistor M2 is coupled to a second terminal of the storage capacitor Cst and an anode electrode of the organic light-emitting diode OLED. Based on a value of voltage stored in the storage capacitor Cst, the second transistor M2 may control the amount of current that flows from a terminal to which the first voltage ELVDD is applied to a terminal to which the second voltage ELVSS is applied via the organic light-emitting diode OLED.

In the current exemplary embodiment, the second voltage ELVSS may have two or more (for example, two) high states (logic 1 states) and two or more (for example, two) low states (logic 0 states) within one image frame. The organic light-emitting diode OLED is lit when supplied with a current that flows from the terminal to which the first voltage ELVDD is applied to the terminal to which the second voltage ELVSS is applied. Therefore, the organic light-emitting diode OLED may be unlit while the second voltage ELVSS is in a high state, since no current flows from the terminal to which the first voltage ELVDD is applied to the terminal to which the second voltage ELVSS is applied. On the other hand, the organic light-emitting diode OLED may be lit while the second voltage ELVSS is in a low state, since a current flows from the terminal to which the first voltage ELVDD is applied to the terminal to which the second voltage ELVSS is applied.

That is, referring to FIG. 5, each of the pixels 510 included in the image apparatus according to the current exemplary embodiment receives the second voltage ELVSS, which has a first rising edge R1, a first falling edge F1, a second rising edge R2 and a second falling edge F2, and which alternates between a high state and a low state within one image frame (one cycle of the vertical synchronization signal Vsync), and is lit or unlit at every first rising edge R1, every first falling edge F1, every second rising edge R2, and every second falling edge F2 of the second voltage ELVSS. While an exemplary circuit of one of the pixels 510 of the image apparatus according to the current exemplary embodiment is illustrated in FIG. 4, the present invention is not limited to the exemplary circuit. The configuration of the circuit may vary as desired.

Referring back to FIG. 3, the voltage generator 450 included in the image apparatus according to the current exemplary embodiment may also provide the above-described second voltage ELVSS to the timing controller 420. When receiving the second voltage ELVSS, the timing controller 420 may provide the feedback control signal CONT_F, which reflects the state of the second voltage ELVSS, to the image signal controller 410. The image signal controller 410 may receive the feedback control signal CONT_F, and may transmit the feedback signal CONT_IR, which is synchronized with the first rising edge R1 of the second voltage ELVSS, as shown in FIG. 5, to the IR signal transmitter 100. When necessary, the timing controller 420 may also provide the feedback signal CONT_IR, which is synchronized with the first rising edge R1 of the second voltage ELVSS, directly to the IR signal transmitter 100 without passing through the image signal controller 410, as described above.

The IR signal transmitter 100, which receives the feedback signal CONT_IR, may output an IR signal IRsync based on the received feedback signal CONT_IR. Specifically, the IR signal transmitter 100 may receive the feedback signal CONT_IR and output the IR signal IRsync, which rises at the first rising edge R1 of the second voltage ELVSS to remain in a high state, and which falls at the second rising edge R2 of the second voltage ELVSS to remain in a low state, as shown in FIG. 5.

The process in which the IR signal IRsync is transmitted to shutter glasses 250 including a shutter controller 200 (see FIG. 1), a left shutter 230, and a right shutter 240, and in which the IR signal IRsync opens or closes the left shutter 230 and the right shutter 240, has been described above in relation to the shutter control system 300 according to the exemplary embodiment of FIG. 1, and thus, any repetitive description thereof will be omitted.

Referring to FIG. 5, a section t_on/off_1, in which the left shutter 230 is opened while the right shutter 240 is closed, is a section between the first rising edge R1 and the first falling edge F1 of the second voltage ELVSS, and a section t_on/off_2, in which the right shutter 240 is opened while the left shutter 230 is closed, is a section between the second rising edge R2 and the second falling edge F2 of the second voltage ELVSS. That is, the organic light-emitting diode OLED is unlit in both of the above two sections.

Therefore, even when the display unit 500 included in the image apparatus according to the current exemplary embodiment alternately displays a right-eye image R and a left-eye image L on each of the pixels 510 in one image frame, as shown in FIG. 6, since the opening or closing of the left shutter 230 and the right shutter 240 occurs in a light-off section, during which the left-eye image L and the right-eye image R are not displayed, 3D crosstalk caused by a response time d of a shutter to the IR signal IRsync, and the on/off speed (t_on/t_off) of the shutter itself, can be reduced or minimized.

Likewise, even when the display unit 500 according to a modified embodiment divides one image frame into two sub-frames, as shown in FIG. 7, and displays a right-eye image R and a left-eye image L separately, since the opening or closing of a left shutter 230 and a right shutter 240 occurs in a light-off section, during which the left-eye image L and the right-eye image R are not displayed, 3D crosstalk caused by a response time d of a shutter to the IR signal IRsync, and the on/off speed (t_on/t_off) of the shutter itself, can be reduced or minimized.

Hereinafter, an image apparatus according to another exemplary embodiment of the present invention will be described with reference to FIGS. 5 through 8.

Figure 8:
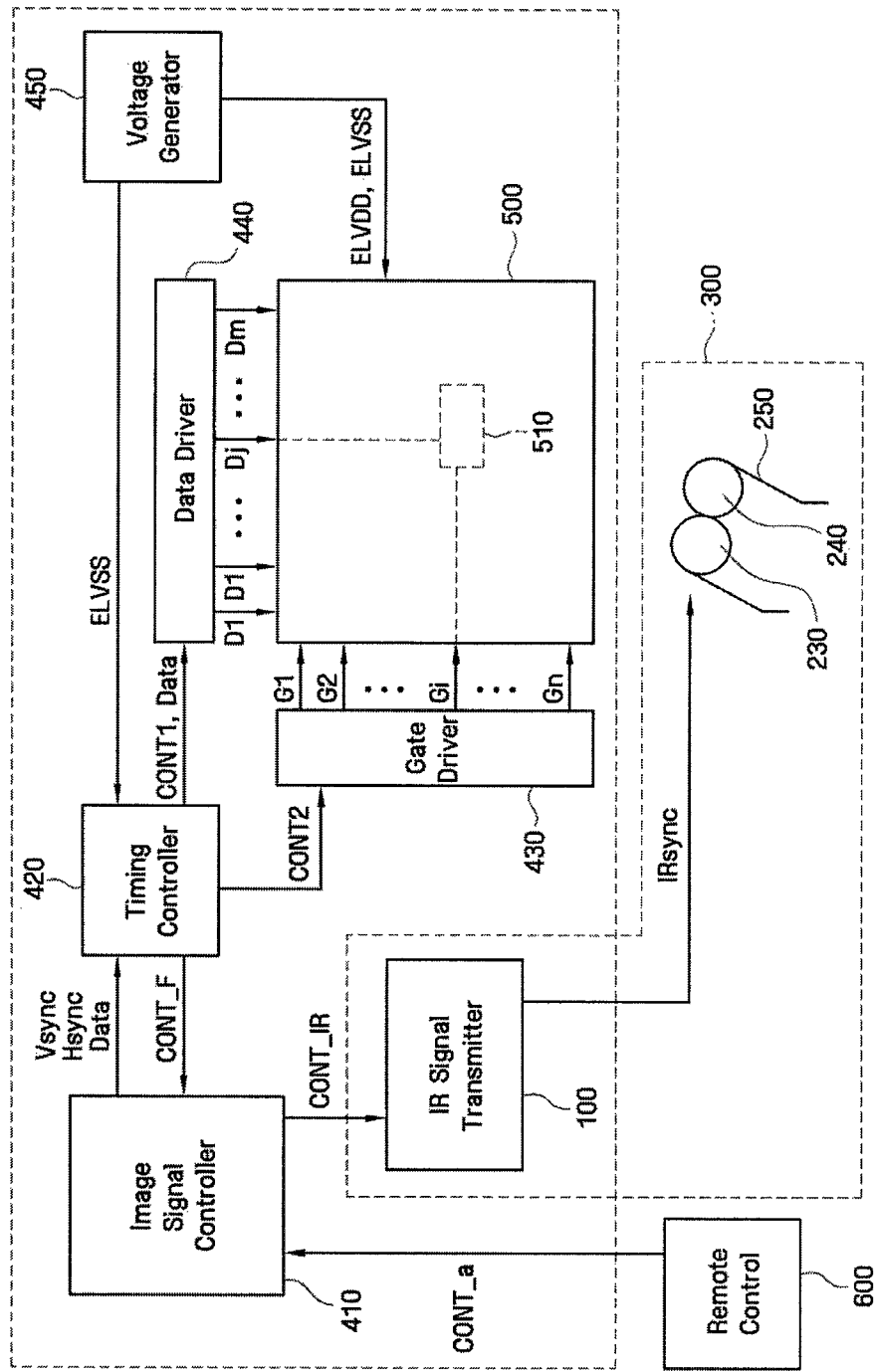
FIG. 8 is a block diagram of an image apparatus according to another exemplary embodiment of the present invention.

FIG. 8 is a block diagram of an image apparatus according to another exemplary embodiment of the present invention. A detailed description of elements identical to the above-described elements of the shutter control system 300 according to the exemplary embodiment of FIG. 1, and the image apparatus according to the previous exemplary embodiment, will be omitted, and the differences between the embodiments will be described below.

Referring to FIG. 8, the image apparatus according to the current exemplary embodiment may further include a remote control 600.

The remote control 600 may receive information about a delay time from a user, and may transmit a delay time control signal CONT_a to an image signal controller 410. When receiving the delay time control signal CONT_a, the image signal controller 410 may provide a feedback signal CONT_IR, which reflects the delay time, to an IR signal transmitter 100.

Here, the delay time input by the user may be an interval a between a falling edge of a vertical synchronization signal Vsync and a first rising edge R1 of a second voltage ELVSS, as shown in FIG. 5. That is, in the current exemplary embodiment, the image signal controller 410 provides the feedback signal CONT_IR, which is synchronized with the first rising edge R1 of the second voltage ELVSS, to the IR signal transmitter 100 based on the delay time a input by the user, instead of receiving the second voltage ELVSS from a voltage generator 450 and providing the feedback signal CONT_IR, which is synchronized with the first rising edge R1 of the second voltage ELVSS, to the IR signal transmitter 100.

The user may input the delay time a in units of 0.01 to 0.05 ms, and the delay time a may have a positive or negative value (e.g., the IR signal IRsync may be either after or before the falling edge of the vertical synchronization signal Vsync). An IR signal IRsync is shifted from a starting point of one image frame (the falling edge of the vertical synchronization signal Vsync) to the left or right by this positive or negative delay time a input by the user. Therefore, the IR signal IRsync can be synchronized with the first rising edge R1 of the second voltage ELVSS. Since the image apparatus operates in the same manner as the above-described embodiments, its 3D crosstalk can be reduced or minimized.

While the present invention has been particularly shown and described with reference to exemplary embodiments thereof, it will be understood by those of ordinary skill in the art that various changes in form and detail may be made therein without departing from the spirit and scope of the present invention as defined by the following claims and their equivalents. The exemplary embodiments should be considered in a descriptive sense and not for purposes of limitation.

What is claimed is:

1. An image apparatus comprising:
a voltage generator configured to generate a first voltage and a second voltage, the second voltage having two or more high states and two or more low states in one image frame;
a display unit comprising a plurality of pixels, configured to receive the first and second voltages, a data signal, and a gate signal, and configured to be lit or unlit corresponding to the first and second voltages, the data signal, and the gate signal;
a controller configured to receive the second voltage and to output a feedback signal corresponding to at least one of a rising edge or a falling edge of the second voltage;
an IR signal transmitter configured to receive the feedback signal and to output an IR signal corresponding to at least one of the rising edge or the falling edge of the second voltage; and
shutter glasses comprising a left shutter, a right shutter, and a shutter controller that is configured to receive the IR signal and to control opening or closing of the left shutter and the right shutter corresponding to the IR signal,
wherein each of the plurality of pixels is configured to receive the first and second voltages at corresponding first and second voltage supplies, the first and second voltage supplies being in a current path when a corresponding one of the pixels is lit.

2. The image apparatus of claim 1, wherein each of the pixels is configured to be unlit when receiving the second voltage in the high state, and is configured to be lit when receiving the second voltage in the low state.

3. The image apparatus of claim 2, wherein the first voltage comprises ELVDD, and the second voltage comprises ELVSS.

4. The image apparatus of claim 1, wherein the second voltage has a first rising edge, a first falling edge, a second rising edge, and a second falling edge, wherein the IR signal rises corresponding to the first rising edge of the second voltage and remains in the high state, and falls corresponding to the second rising edge of the second voltage and remains in the low state.

5. The image apparatus of claim 4, wherein the shutter controller of the shutter glasses is configured to control the left shutter to be opened while controlling the right shutter to be closed corresponding to a rising edge of the IR signal, and is configured to control the right shutter to be opened while controlling the left shutter to be closed corresponding to a falling edge of the IR signal.

6. The image apparatus of claim 5, wherein a section in which the left shutter is opened while the right shutter is closed is between the first rising edge and the first falling edge of the second voltage, and a section in which the right shutter is opened while the left shutter is closed is between the second rising edge and the second falling edge of the second voltage.

* * * * *